(12) United States Patent
Palit

(10) Patent No.: US 12,044,527 B2
(45) Date of Patent: Jul. 23, 2024

(54) INDUCTIVE DISPLACEMENT AND/OR POSITION DETECTION

(71) Applicant: ZF FRIEDRICHSHAFEN AG, Friedrichshafen (DE)

(72) Inventor: Ajoy Palit, Bremen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 42 days.

(21) Appl. No.: 17/640,426

(22) PCT Filed: Aug. 26, 2020

(86) PCT No.: PCT/EP2020/073814
§ 371 (c)(1),
(2) Date: Mar. 4, 2022

(87) PCT Pub. No.: WO2021/043643
PCT Pub. Date: Mar. 11, 2021

(65) Prior Publication Data
US 2022/0316852 A1    Oct. 6, 2022

(30) Foreign Application Priority Data
Sep. 4, 2019    (DE) .................... 10 2019 213 387.8

(51) Int. Cl.
*G01B 7/00*    (2006.01)
*G01D 5/20*    (2006.01)

(52) U.S. Cl.
CPC ........... *G01B 7/003* (2013.01); *G01D 5/2013* (2013.01); *G01D 5/202* (2013.01)

(58) Field of Classification Search
CPC .. G01D 5/2013; G01D 5/2452; G01D 5/2451; G01D 5/202; G01B 7/003
See application file for complete search history.

(56) References Cited

U.S. PATENT DOCUMENTS

2002/0154518 A1* 10/2002 Elferich .................. H02J 50/12
                                                    363/15
2003/0102862 A1*  6/2003 Goto .................... G01D 5/202
                                                    324/207.16
(Continued)

FOREIGN PATENT DOCUMENTS

DE    19749855 A1 *  6/1999  ....... B60R 21/01546
DE    19749855 A1    6/1999
(Continued)

OTHER PUBLICATIONS

Bauer et al._DE-19749855-A1_1999_Machine Translation (Year: 1999).*
(Continued)

*Primary Examiner* — Jermele M Hollington
*Assistant Examiner* — Suresh K Rajaputra
(74) *Attorney, Agent, or Firm* — ROSSI, KIMMS & McDOWELL LLP

(57) ABSTRACT

The invention relates to a sensor arrangement (7) for detecting a position and/or a displacement of a flux element assembly (8) along a longitudinal direction, with a coil assembly (1) and the flux element assembly (8), wherein the coil assembly (1) comprises at least two flat coils (2a, b), wherein the flux element assembly (8) comprises at least two flux elements (9a, b), wherein the at least two flux elements (9a, b) are arranged adjacent to one another in the longitudinal direction and offset in transverse direction, wherein the flux element assembly (8) and the coil assembly (1) are movable and/or displaceable relative to one another in the longitudinal direction, wherein the flat coils (2a, b) are designed, such that an actual inductance ($L_1$, $L_2$) of each flat coil (2a, b) is dependent on the actual displacement of the flux element assembly (8) relative to the coil assembly (1), with an evaluation device, which is set up to determine the actual inductance ($L_1$, $L_2$) for each flat coil (2a, b) and (Continued)

determine the actual displacement based on the determined actual inductances ($L_1$, $L_2$).

20 Claims, 2 Drawing Sheets

(56) References Cited

U.S. PATENT DOCUMENTS

| | | | | |
|---|---|---|---|---|
| 2003/0151402 | A1* | 8/2003 | Kindler | G01B 7/003 324/164 |
| 2014/0247040 | A1* | 9/2014 | Reitsma | H03H 2/005 324/207.15 |

FOREIGN PATENT DOCUMENTS

| | | |
|---|---|---|
| DE | 10231980 A1 | 2/2004 |
| DE | 202008013715 U1 | 1/2009 |
| DE | 1020008064544 A1 | 7/2010 |
| DE | 102015204052 A1 | 9/2016 |
| DE | 102016204016 A1 | 9/2017 |
| DE | 102017211493 A1 | 1/2019 |
| EP | 3155297 A1 | 4/2017 |

OTHER PUBLICATIONS

Bin Abdullah, Muhammad Azfar, et al. "Parametric study of the position of textile dipole antenna above the textile artificial magnetic conductor." 2012 International Symposium on Antennas and Propagation (ISAP). IEEE, 2012.

PCT International Search Report for corresponding International Application Serial No. PCT/EP2020/073814, mailed Nov. 20, 2020, pp. 1-6.

German Search Report for corresponding German Application Serial No. 10 2019 213 387.8, dated Mar. 23, 2020, pp. 1-16.

* cited by examiner

INDUCTIVE DISPLACEMENT AND/OR POSITION DETECTION

RELATED APPLICATIONS

This application is a U.S. National Stage Application filed under 35 USC 371, claiming priority to Serial No. PCT/EP2020/073814, filed on 26 Aug. 2020; which claims priority from German Patent Application DE 10 2019 213 387.8, filed 4 Sep. 2019, the entireties of which are hereby incorporated herein by reference.

TECHNICAL FIELD

The invention relates to a sensor arrangement for detecting a displacement and/or a position along a longitudinal direction. The sensor arrangement comprises a flux element assembly and a coil assembly, as well as an evaluation device. The sensor arrangement is designed in particular for a seatbelt arrangement or a gearshift for an automatic vehicle transmission.

BACKGROUND

The detection of a longitudinal displacement and/or a position in the longitudinal direction is required in many technical fields, particularly in the automotive sector. Preferably, sensor arrangements are used here, which can be integrated into an interior as compactly and concealed as possible. For example, similar sensor arrangements are used in seatbelt arrangements in order to determine the extension length of the seatbelt. Furthermore, such sensor arrangements are used in gearshifts, especially in automatic transmissions, in order to determine the actual position of the gearshift.

The publication "Frequency Response Modeling of Inductive Position Sensor with Finite Element Tools" by A. K. Palit, https://www.comsol.de/paper/frequency-response-modeling-of-inductive-position-sensor-with-finite-element-too-18933 (retrieved on Aug. 28, 2019), discloses an inductive sensor for longitudinal displacement determination.

SUMMARY

The invention is based on the task of improving the inductive determination of a displacement and/or position along a longitudinal direction.

The task is solved by a sensor arrangement for detecting a displacement of a flux element assembly along a longitudinal direction, as well as by a seatbelt arrangement and a method according to claim 13. Preferred and/or advantageous embodiments of the invention result from the dependent claims, the description, and the accompanying drawings.

The invention relates to a sensor arrangement for detecting a position, in particular a position of a flux element assembly and/or a flux element along a longitudinal direction. The sensor arrangement is designed in particular to detect a displacement of a flux element assembly and/or a flux element along a longitudinal direction. For example, the sensor arrangement may be used to determine a relative displacement of the flux element assembly and/or a flux element along a longitudinal direction relative to a coil assembly and/or flat coil. The sensor arrangement is designed for inductive detection of the displacement and/or position in the longitudinal direction. The sensor arrangement is designed, e.g., for a seatbelt arrangement in a vehicle or a gearshift in a vehicle. For example, the sensor arrangement is designed to determine the position of a gearshift, in particular of an automatic transmission gearshift, specifically whether N, P or D is selected. Furthermore, the sensor arrangement may be configured to determine how far a belt of a seatbelt arrangement is extended based on the displacement of the flux element assembly. The displacement in the longitudinal direction is, for example, a displacement along an uncurved path, alternatively, the displacement along a circular or curvilinear path in the longitudinal direction can be determined by means of the sensor arrangement.

The sensor arrangement comprises a flux element assembly and a coil assembly, and an evaluation device. Preferably, the coil assembly forms a stationary coil assembly, e.g., arranged or arrangeable in a stationary manner in the vicinity, a component, housing or vehicle. The flux element assembly is preferably a movable flux element assembly.

The coil assembly has at least two flat coils. Preferably, the coil assembly comprises exactly two flat coils, alternatively three, four or more flat coils. The flat coils of the coil assembly are preferably of identical design, e.g., with the same geometry and/or inductances. Alternatively, the flat coils of the coil assembly may be designed differently, e.g., with different geometries and/or inductances. The flat coils are arranged adjacently in the transverse direction. The transverse direction is arranged transversely to the longitudinal direction. For example, the transverse direction is perpendicular to the longitudinal direction. In particular, flat coils are understood to mean electric coils of a flat shape. Preferably, the flat coils with their planar extension are situated in the transverse-longitudinal direction plane, which is spanned by the direction vectors in longitudinal and transverse direction. Specifically, the flat coils are arranged immediately adjacent to one another in the transverse direction. More specifically, the coil assembly may include more than two flat coils, whereby the more than two flat coils preferably are arranged adjacently in the transverse direction. The flat coils may be designed, e.g., as printed coils. In particular, the flat coils form single-layer coils. Alternatively, the flat coils may form multi-layer flat coils. The flat coils preferably have a rectangular and/or square surface and/or contour, whereby this surface is situated, in particular, in the longitudinal-transverse plane.

The flux element assembly includes at least two flux elements. Specifically, the flux element assembly comprises exactly two flux elements, alternatively more than two flux elements, e.g., five or ten flux elements. The flux elements are preferably of a flat design. For example, the flux elements may have a rectangular, square, round or elliptical surface. The planar extension of the flux elements is arranged, in particular such that they are situated parallel and/or equidirectional to the transverse-longitudinal direction plane. The at least two flux elements are offset from one another in the longitudinal and transverse direction. In particular, the two flux elements are arranged adjacent to one another. In particular, two adjacent flux elements are always arranged offset and/or displaced relative to one another in the longitudinal direction and in the transverse direction. In particular, the flux elements of the flux element assembly are arranged such that, when the flux element assembly is arranged above the coil assembly, a flux element covers one of the at least two coils, wherein the second coil is not covered by the adjacent flux elements, and wherein the covering is understood to be in the form of a projection. The flux elements are and/or comprise, e.g., an electrically conductive material. In particular, the flux elements may be designed as ferromagnetic or diamagnetic. If the flux element assembly comprises more than two flux elements, a first and second flux element counted in the longitudinal direction are offset from one another in the longitudinal and transverse directions, wherein a third flux element, which follows the second flux element in the longitudinal direction, is offset only in the longitudinal direction with respect to the first flux element.

The flux element assembly defines and/or determines a flux element level. For example, the flux element plane is the plane in which all flux elements of the flux element assembly are situated. Alternatively, the flux element plane can be understood to be the plane, which is spanned by the flux elements, which are currently parallel and/or minimally spaced from the coil assembly and/or coil plane. The coil plane is defined in particular by the coil assembly. For example, the coil plane is the plane, in which the planar flat coils are arranged.

The coil plane is spaced from the flux element plane. In particular, the coil plane and flux element plane are arranged equidistantly and/or parallel to one another. In particular, e.g., in the case of a pliable and/or curved coil plane or flux element plane, the coil plane and flux element plane are equidistantly spaced and/or arranged parallel to one another at least in sections, wherein this sectional arrangement is present, in particular, in the area of the flat coils.

The flux element assembly and the coil assembly are movable and/or displaceable relative to one another in the longitudinal direction. In particular, the flux element assembly and/or coil assembly are guided relative to one another and can be moved in the longitudinal direction. For example, the movement of the flux element assembly relative to the coil assembly is predetermined and/or to be understood as a trajectory. The trajectory points in particular in longitudinal direction and/or has only the longitudinal direction as the degree of freedom of movement. In particular, it is provided that the coil assembly is arranged in a stationary manner in the sensor arrangement and/or at its installation location, wherein the flux element assembly is movable and/or displaceable in the longitudinal direction relative to the coil assembly. By shifting and/or moving the flux element assembly along the longitudinal direction, e.g., the flux elements of the flux element assembly are moved relative to the coil assembly and in particular to the flat coils. Specifically, due to the movement and/or displacement of the flux element assembly and/or flux elements, flat coils are covered and/or covered to different extents according to the actual displacement of different flux elements.

The flat tracks are designed and were arranged, such that the actual inductances of each flat coil depend on the displacement of the flux element assembly and/or the flux elements relative to the coil assembly. Depending on the displacement, a flat coil is covered to a different extent and/or by a different number of flux elements in the projection onto the coil plane. The degree of coverage, covering and/or a changed distance of a flux element to the flat coil influences and/or changes the actual inductance of the flat coil. For example, induction of eddy currents into the flux element assembly and/or flux element results in changes in the inductances of the respective adjacent and/or inducing flat coils.

The evaluation device is designed and/or set up in order to determine the actual inductances for each flat coil. For example, the evaluation device is designed to electrically excite the flat coils with a frequency and on this basis determine the actual inductance. Depending on the coverage of the respective flat coil and/or spacing of the respective flat coil by the flux elements, the actual inductances are different. The evaluation device is designed to determine the displacement and/or the position in the longitudinal direction based on the actual inductances of the flat coils, in particular of all flat coils of the coil assembly or a subset thereof. For example, by determining the actual inductances, the evaluation device is able to determine the relative position of the flux element assembly and the coil assembly relative to one another, whereby the displacement and/or position can also be determined specifically on the basis of this determination.

The invention is based on the notion of not arranging coils of a coil assembly adjacent in the longitudinal direction, but in the transverse direction, such that a particularly small coil assembly can be achieved. In order make possible an advantageous displacement resolution and/or positional resolution, the invention provides for realizing the flux element assembly, such that compensation for the arrangement of the coils in the transverse direction is achieved by the offset arrangement of the flux elements in the transverse and longitudinal direction.

An embodiment of the invention provides that each of the flat coils defines a coil area. Coil area is understood to mean in particular the area, contour and/or shape of the surface. Each of the flux elements define a flux element area. In particular, the coil area and the flux element area are each the areas that lie parallel and/or equidirectional to the longitudinal-directional plane. The embodiment provides that the flux element areas and the coil areas are congruent and/or coincident. For example, the flux element areas and coil areas are designed as rectangles, in particular squares. In particular, congruent is understood to mean that when a flux element is arranged perpendicularly above the coil area and/or the flat coil, the coil area and flux element area are and/or can be brought into congruence.

Optionally, it is provided that the flux element assembly has and/or comprises a plurality, in particular more than two flux elements. In this case, two adjacent flux elements are arranged offset in the longitudinal and transverse direction, with one flux element being arranged relative to the second-in-line flux element only in the longitudinal direction and without transverse offset. This embodiment is based on the consideration of creating a zigzag-like structure of the flux elements along the longitudinal direction in the flux element assembly. By moving and/or displacing the flux element assembly in the longitudinal direction, one of the two flat coils of the coil assembly is therefore alternately covered by a flux element and/or their inductances are influenced.

It is particularly preferred that the flux elements in the flux element assembly are arranged in a checkerboard fashion. For example, the flux element assembly is divided into two halves and/or sections in the transverse direction, whereby within the halves and/or sections, flux elements are arranged alternately with a gap or no flux element in the longitudinal direction. For example, the flux element assembly may be conceived as a matrix with rows and columns, with flux element and no flux element or gap arranged alternately along the rows and along the columns. No flux element may be, e.g., similar to a void, a gap, air or a support material. Particularly preferred is a matrix-like division of the flux element assembly with two rows in the transverse direction and n flux elements in the longitudinal direction, where n is a natural number greater than 2, in particular greater than 4.

Specifically, it is provided that the flux elements each have and/or define a measurement area. For example, the measurement area is the areal extent of the flux element, preferably parallel to the coil plane, and more specifically, the metallic portion of the areal extent. It is provided that the flux elements are arranged within the flux element assembly, such that in the longitudinal direction, the measuring areas do not overlap, but are arranged without gaps. For example, the flux elements may be designed as rectangles, with two adjacent flux elements contacting one another at the corner areas.

An embodiment of the invention provides that the flux elements are flat metal elements. For example, the flat metal elements are metal platelets or metal foil sections. For example, the metal elements are brass, aluminum, or iron. Specifically, the metal elements are designed as copper platelets and/or copper foil sections.

It is particularly preferred that the flux element assembly has a support. The flux elements are, e.g., printed, glued, twisted on, woven in, sewn on, or applied onto the support. In particular, the support and flux element are integrally connected to one another. The support is preferably designed as a flat support, in particular extending in the longitudinal and transverse direction.

It is particularly preferred for the support to be of flexible and/or pliable design. For example, the support is designed as a film, plastic, or metal foil. Alternatively, the support may be designed to be rigid, e.g., as a plastic or metal plate.

Optionally, it is provided that the support forms a textile. For example, the support is designed as a knitted or woven fabric. Specifically, the support may be in the form of a seatbelt strap.

An embodiment of the invention provides that each of the flat coils has and define a winding plane. In particular, the winding plane is aligned with the flux element plane. In particular, the windings of the flat coil are arranged within the winding plane, e.g., as a helical winding and, more specifically, as a square winding.

It is particularly preferred that the coil assembly is of a stationary design and/or arrangement. For example, the coil assembly is stationary and/or fixed in the sensor arrangement or a housing of the sensor arrangement. In particular, it is provided that the flux element assembly, the support and/or the flux elements are designed to be movable and/or displaceable, in particular relative to the coil assembly, the flat coils and/or the housing of the sensor arrangement.

A further object of the invention is a seatbelt arrangement for a vehicle, where the seatbelt arrangement comprises a seatbelt and a coil assembly. In particular, the coil assembly is formed as described above and/or as in the sensor arrangement according to any of claims 1-11. Flux elements are arranged on the seatbelt, being embossed, glued, printed or woven in. In particular, the seatbelt or section above and/or parallel to the coil assembly defines the flux element plane. The flux elements are arranged on the seatbelt, such that two adjacent flux elements are spaced apart from one another in the longitudinal direction and transverse direction. In particular, the seatbelt forms a support, as described for the sensor arrangement. The seatbelt is movable and/or slidable relative to the coil assembly. In particular, the seatbelt is movable and/or displaceable relative to the coil assembly in the longitudinal direction. By shifting and/or moving the seatbelt in the longitudinal direction, flat coils of the coil assembly, which are arranged in a transverse direction, are alternately covered and/or released by flux elements of the flux element assembly. The flux elements and/or the flux element assembly influences the actual inductances of the flat coils. In particular, the seatbelt arrangement comprises an evaluation device, in particular the evaluation device as previously described. The evaluation device is designed to determine a displacement and/or position of the seatbelt, the flux elements and/or flux element assembly in the longitudinal direction based on the measured actual inductances. For example, the inductances of the at least two flat coils spaced apart in the transverse direction are determined for this purpose, and based on this determination the arrangement and/or a degree of coverage of the elements can usually be determined, and on this basis, the extension length and/or position of the seatbelt can be determined.

A further object of the invention is a method for determining a displacement and/or position in and/or along a longitudinal direction. The method is designed to detect the displacement and/or position using the sensor arrangement of any of claims 1-11 and/or the seatbelt arrangement. The method provides that for each of the flat coils, the actual inductance is determined and the displacement and/or position is determined based on the determined actual inductances.

BRIEF DESCRIPTION OF THE DRAWINGS

Further advantages, effects and embodiments result from the attached drawings and their description. In the drawings.

DESCRIPTION

Figure 1:
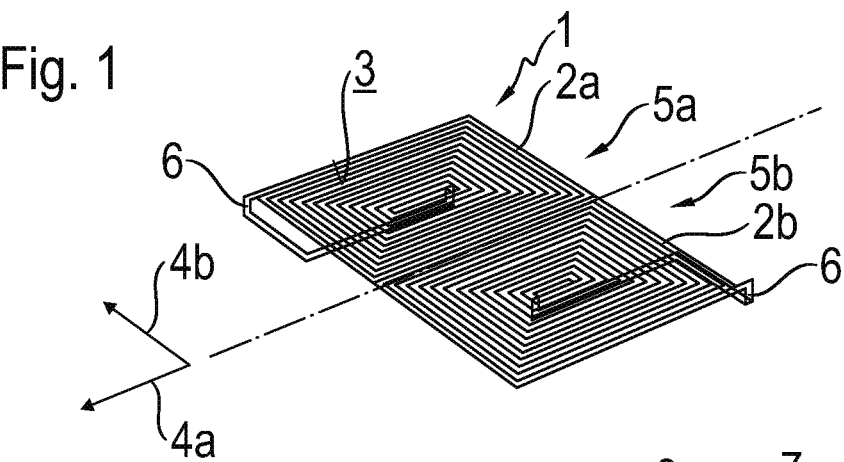
FIG. 1 shows a coil assembly.

FIG. 1 shows an exemplary embodiment of a coil assembly 1. Coil assembly 1 comprises two flat coils 2a and 2b. The coil assembly 1 and the flat coils 2a, 2b are flat, and define a coil plane 3, wherein the windings of the flat coils 2a, 2b are situated in the coil plane 3.

Directional vectors 4a and 4b are penned in as an alternative in order to explain the sensor arrangement shown later. The longitudinal direction is oriented along the direction vector 4a, while the transverse direction is perpendicular to the longitudinal direction and is represented by the direction vector 4b. The coil plane 3 is parallel to the plane spanned by the direction vectors 4a and 4b. This plane spanned by the direction vectors 4a and 4b is also referred to as the longitudinal-transverse plane.

The flat coils 2a, 2b are arranged adjacently. In particular, the flat coils 2a, 2b are arranged immediately adjacent to one another in the transverse direction. The flat coils 2a, 2b divide the coil plane 3 in the transverse direction into two parts, also called lines 5a and 5b. In particular, the division in the transverse direction through the flat coils 2a, 2b is a half division. The flat coils 2a, 2b thus have the same surface area, in particular as regards both surface area and shape.

The flat coils 2a, 2b each have a contact 6, wherein the contact 6 is used to make contact with an evaluation device. The evaluation device is designed to determine the respective inductances L, in particular actual inductances L of the two flat coils 2a, 2b. For example, the physics and/or mathematics of an oscillating circuit are used to measure the interactivity L. For example, the flat coil 2a, 2b is supplied with AC voltage of certain frequencies by means of the evaluation device via the contact 6, and the inductance L is determined based on the reaction thereto.

Figure 2:
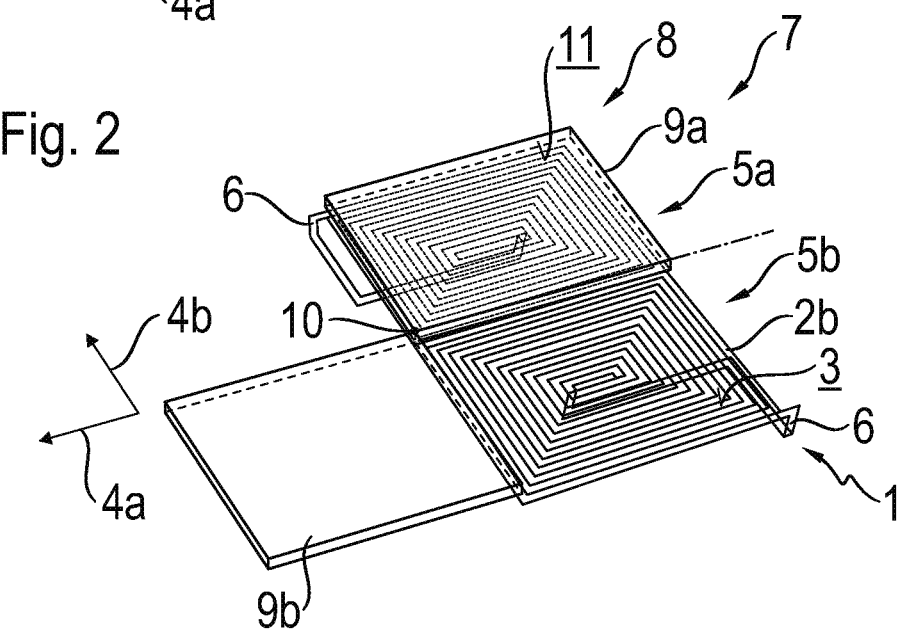
FIG. 2 shows a sensor arrangement as an embodiment of the invention.

FIG. 2 shows an exemplary embodiment of a sensor arrangement 7. The sensor arrangement 7 comprises the coil assembly 1 of FIG. 1. Furthermore, the sensor arrangement 7 comprises a flux element assembly 8. The flux element assembly 8 comprises two flux elements 9a and 9b. The flux elements 9a and 9b are designed as metallic flat elements. For example, the flux elements 9a and 9b are designed as copper plates. The flux elements 9a and 9b are arranged adjacent to one another, in particular they make contact in a contact area 10. Contacting in the contact area 10 takes place at corner areas of the flux elements 9a and 9b. The flux elements 9a and 9b are arranged in a common plane, i.e., the flux element plane 11. The flux element plane 11 is arranged parallel to the coil plane 3. In particular, coil plane 3 and flux element plane 11 are arranged parallel to one another. Within the flux element plane 11, the flux elements 9a and 9b are offset from one another in both the longitudinal and transverse directions. The arrangement of the flux elements 9a and 9b is in particular checkerboard-like. In other words, the arrangement of the flux elements 9a and 9b can be viewed in particular as opposing windmill blades.

The flux element assembly 8 and the flux elements 9a and 9b are displaceable in the longitudinal direction. In particular, the displacement takes place within the flux element plane and/or parallel to the coil plane 3. Moving the coil assembly 8 changes the capping and/or covering by the flux elements 9a and 9b of the flat coils 2a, 2b. Capping and/or covering refer in particular to the enclosure in a plan view from above, in particular perpendicular to the coil plane 3, of the flat coils 2a, 2b by the flux elements 9a, 9b. For example, in the embodiment shown, the flat coil 2a is completely covered and/or capped by the flux element 9a. In the embodiment shown, the flat coil 2b is not covered by either the flux element 9a or the flux element 9b. By moving the flux element assembly 8, in this example to the right, the capping of the flat coil 2a is reduced and the flat coil 2b is increasingly covered by the flux element 9b.

The inductances of the flat coils 2a, 2b depend on the coverage and/or capping by the flux elements 9a and 9b. In the example described here, the capping of a flat coil 2a, 2b increases the actual inductance L of the flat coil 2a, 2b. Accordingly, in the state shown, the measured actual inductance L1 of the flat coil 2a is greater than the actual inductance L2 of the flat coil 2b. By determining both actual inductances L1, L2, the position of the flux element 9a, 9b or the flux element assembly 8 can be determined by the evaluation device. In particular, the evaluation device is designed to determine the displacement based on this determination, e.g., as a displacement of the flux element assembly 8 relative to the coil assembly 1.

Figure 3:
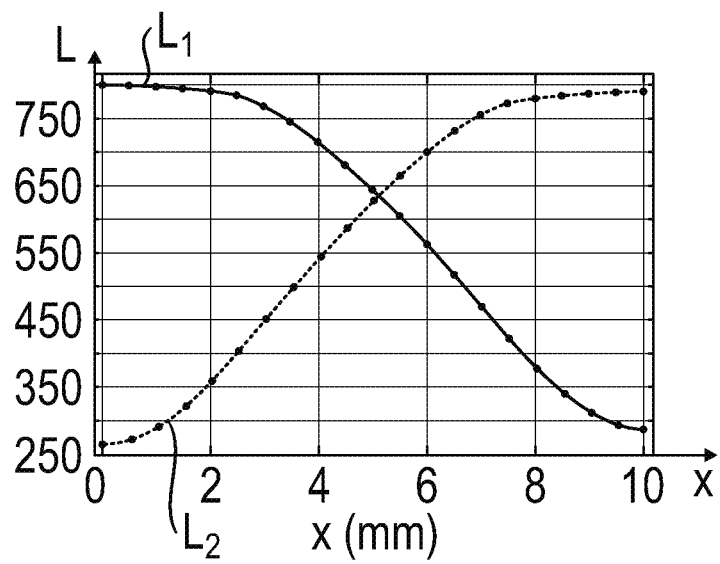
FIG. 3 shows an inductance curve of the flat coils in FIG. 2.

FIG. 3 shows a measured and/or expected inductance curve for the two flat coils 2a, 2b for the sensor arrangement 7 shown in FIG. 2. In the diagram, the longitudinal displacement x of the flux element assembly 8 relative to the coil assembly 1 is plotted in millimeters along the abscissa. In particular, this represents the displacement, which is measured and/or is to be determined. The inductances in nanohenry are plotted on the ordinate.

The diagram shows the inductances L1 and L2. The inductance L1 corresponds to the inductance of the flat coil 2a shown in FIG. 2. This is fully capped by the flux element 9a for a displacement of 0, such that the actual inductance L1 for x=0 is at a maximum. In this case, the maximum inductance L1 for the flat coil 2a is roughly 800 nanohenries. The inductance L2 represents the actual inductance of the flat coil 2b shown in FIG. 2. For a displacement of 0, the latter is fully uncovered and/or fully uncapped. The actual measured inductance L2 is thus minimal for x=0, since it can only increase due to increased covering. This minimum inductance for L2 is roughly 270 nanohenry. By a displacement of the flux element assembly 8, e.g., here the displacement of the flux element assembly 8 to the right in FIG. 2, the capping of the flat coil 2a decreases, such that the actual inductance L1 of the flat coil 2a decreases with increasing displacement, whereas the flat coil 2b is increasingly capped by the flux element 9b due to increasing displacement, such that increasing inductance L2 is recorded. Thus, the inductances L1 and L2 are in opposite directions, so that by measuring the actual inductances L1, L2 of both flat coils 9a, 9b, the positioning of the flux element assembly relative to the coil assembly 1 can be determined by the evaluation device.

Figure 4:
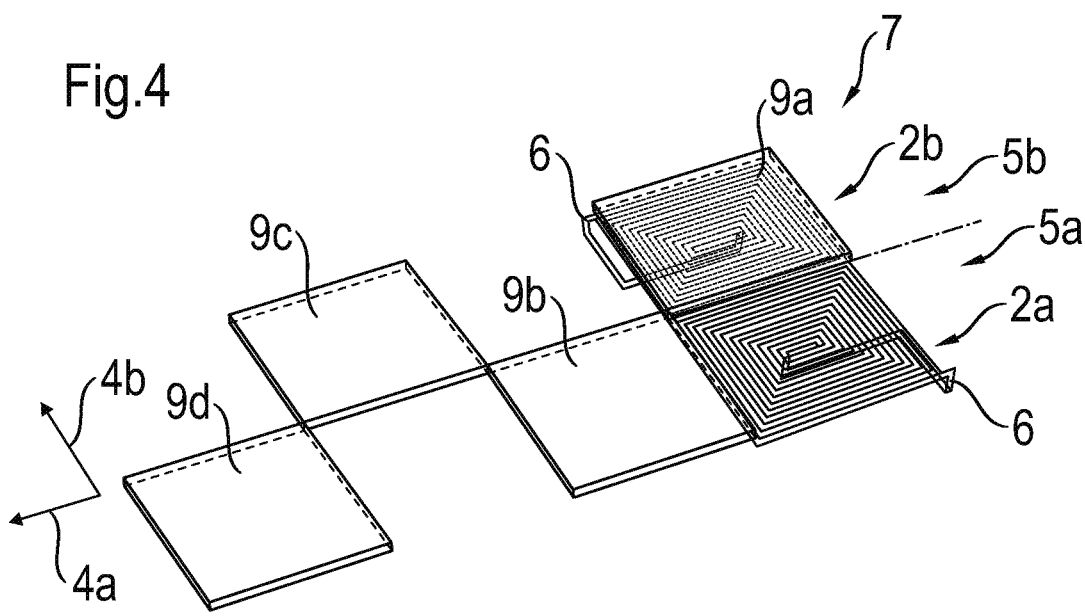
FIG. 4 shows a sensor arrangement as an exemplary embodiment of the invention.

FIG. 4 shows an exemplary embodiment of a sensor arrangement 7, which in turn comprises two flat coils 2a, 2b in a coil group 1. The coil assembly 1 is designed like the coil assembly of FIG. 1.

Unlike the sensor arrangement 7 in FIG. 2, the flux element assembly 8 here includes four flux elements 9a, 9b, 9c and 9d. The flux elements 9a, 9b, 9c and 9d are arranged in a checkerboard fashion in the flux element plane, i.e., a plane parallel to the coil plane 3. Within a line 5a, 5b, flux elements 9a, 9b, 9c and 9d each alternate with a gap. A gap in one line 5a, 5b corresponds to a flux element 9a, 9b, 9c and 9d in the other line 5b, 5a in the transverse direction.

By displacing the flux element assembly 8 longitudinally, each flat coil 2a, 2b is fully capped and fully released several times, in this case twice. The inductances L1, L2 are passed through several minima and maxima by this displacement, which are used for position determination and/or displacement determination by the evaluation device.

Figure 5:
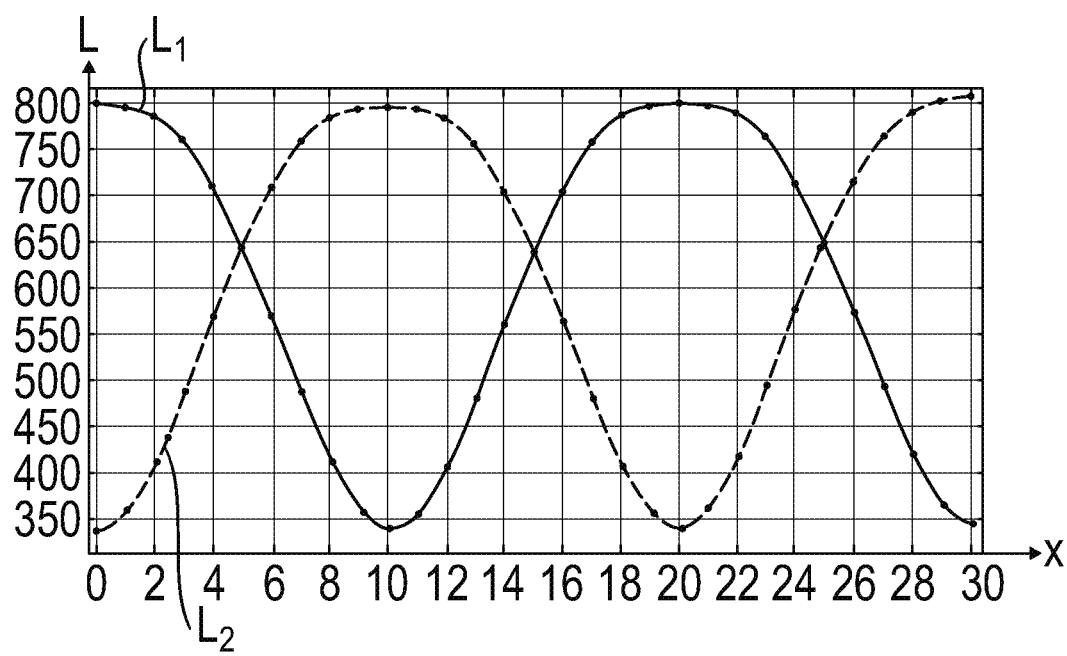
FIG. 5 shows an inductance curve for the sensor arrangement in FIG. 4.

FIG. 5 shows the corresponding induction curve in the flat coils 2a, 2b for the sensor arrangement 7 shown in FIG. 4. The inductance L1, of the coil 2a starts at a maximum due to maximum covering at x=0 by the flux element 9a, where the inductance L1 for increasing displacement are at a minimum, i.e., when the flux element 9b completely covers the coil 2b, the next inductance L1 maximum is reached for the displacement, when the flux element 9c completely covers the coil 2a. An analogous curve is obtained for the inductance L2 of coil 2b, where it starts at a minimum for x=0, since the coil is completely uncapped by flux elements here. Based on this curve, the evaluation device determines the displacement and/or position in the longitudinal direction.

REFERENCE NUMERALS

1 Coil assembly
2a,b Flat coils
3 Coil plane
4a,b Direction vectors
5a,b Lines
6 Contact
7 Sensor arrangement
8 flux element assembly
9a-d Flux elements
10 Contact area
11 Flux element plane
$L_1$, $L_2$, Inductivities
x Longitudinal displacement

The invention claimed is:
1. A sensor arrangement for detecting a position and/or a displacement of a flux element assembly along a longitudinal direction, comprising:
a coil assembly; and the flux element assembly, wherein the coil assembly comprises at least two flat coils, wherein the at least two flat coils are arranged directly adjacent to one another in a transverse direction transverse to the longitudinal direction such that the at least two flat coils are arranged without gaps therebetween in the transverse direction, wherein the flux element assembly comprises at least two flux elements, wherein the at least two flux elements are arranged adjacent to one another in the longitudinal direction, and offset in the transverse direction, wherein the flux element assembly defines a flux element plane and the coil assembly defines a coil plane, wherein the coil plane is arranged at a distance from the flux element plane, wherein the flux element assembly and the coil assembly are movable and/or displaceable relative to one another in the longitudinal direction, wherein the flat coils are designed such that an actual inductance of each flat coil is dependent on the actual displacement of the flux element assembly relative to the coil assembly, and wherein an evaluation device, which is set up to determine the actual inductance for each flat coil, determines the actual displacement based on the determined actual inductances.

2. The sensor arrangement according to claim 1, wherein the flat coils each define a coil area and the flux elements each define a flux element area, and wherein each flux element area is congruent with an associated coil area.

3. The sensor arrangement according to claim 1, wherein the flux element assembly has a plurality of flux elements, wherein two adjacent flux elements are arranged offset in the longitudinal direction and in the transverse direction, and wherein the flux elements are arranged spaced apart in the longitudinal direction relative to the flux element arranged adjacent thereto and without transverse offset.

4. The sensor arrangement according to claim 1, wherein the flux elements in the flux element assembly are arranged in a checkerboard fashion.

5. The sensor arrangement according to claim 1, wherein the flux elements are designed as flat metal elements.

6. The sensor arrangement according to claim 1, wherein the flux elements each have a measuring surface area, and wherein the flux elements are arranged in the flux element assembly, such that the measuring surface areas do not overlap and are arranged without gaps in the longitudinal direction.

7. The sensor arrangement according to claim 1, wherein the flux element assembly has a support, and wherein the flux elements is printed, glued, embossed, woven in and/or applied on the support.

8. The sensor arrangement according to claim 7, wherein the support is designed to be flexible and/or pliable.

9. The sensor arrangement according to claim 7, wherein the support forms a textile.

10. The sensor arrangement according to claim 1, and wherein the flat coils each have a winding plane, and wherein the flat coils are arranged with their winding planes in the same direction as the flux element plane.

11. The sensor arrangement according to claim 1, wherein the coil assembly is designed to be stationary and the flux element assembly is designed to be movable and/or displaceable.

12. A seatbelt arrangement for a vehicle, the seatbelt arrangement comprising: a seatbelt; and a coil assembly, wherein the coil assembly comprises at least two flat coils, wherein the at least two flat coils are arranged directly adjacent to one another in a transverse direction transverse to the longitudinal direction such that the at least two flat coils are arranged without gaps in the transverse direction, wherein the seatbelt comprises a flux element assembly with at least two flux elements, wherein the at least two flux elements are arranged adjacent to one another in the longitudinal direction and offset in the transverse direction, wherein the flux element assembly defines a flux element plane and the coil assembly defines a coil plane, wherein the coil plane is arranged spaced apart from the flux element plane, wherein the flux element assembly and the coil assembly are movable and/or displaceable relative to one another in the longitudinal direction, wherein the flat coils are designed such that an actual inductance of each flat coil is dependent on the actual displacement of the flux element assembly relative to the coil assembly, and wherein the seatbelt arrangement further comprises an evaluation device, which is set up to determines the actual inductance for each flat coil and determine the actual displacement and/or an extraction length of the seatbelt based on the determined actual inductances.

13. A method for determining a displacement and/or position by means of the sensor arrangement according to claim 1, wherein for each of the flat coils, the actual inductance is determined, and the displacement and/or position is determined based on the determined actual inductances.

14. The sensor arrangement according to claim 1, wherein the flux elements are arranged such that whenever one of the flux elements completely covers one of the at least two flat coils, every other flat coil is left completely uncovered by the flux elements.

15. The sensor arrangement according to claim 1, wherein the flat coils each define a coil area and the flux elements each define a flux element area, the coil and the flux areas all having the same size and shape.

16. The sensor arrangement according to claim 1, wherein or example, the flux element assembly defines a matrix of rows and columns, each row and column having an alternating sequence of flux elements and spaces where no flux elements are present.

17. The sensor arrangement according to claim 1, wherein each flux element directly contacts an adjacent flux element.

18. The sensor arrangement according to claim 1, wherein each flat coil is configured to be supplied with a voltage.

19. A position and/or displacement detecting sensor arrangement, comprising:

a flux element assembly including at least two flux elements, the at least two flux elements being arranged offset to one another in a longitudinal direction and a transverse direction, the transverse direction being transverse to the longitudinal direction, the at least two flux elements each having a measuring surface area, the at least two flux elements being arranged in the flux element assembly such that the measuring surface areas do not overlap and are arranged without gaps in both the longitudinal and transverse directions, the flux element assembly defining a flux element plane;

a coil assembly including at least two coils, the at least two coils being arranged in the transverse direction, the coil assembly defining a coil plane that is arranged at a distance from the flux element plane, the coil assembly and the flux element assembly being movable and/or displaceable relative to one another in the longitudinal direction, the at least two coils being configured such that an actual inductance of each coil is dependent on an actual longitudinal displacement of the flux element assembly relative to the coil assembly; and an evaluation device configured to determine the actual inductance for each coil and determine the actual longitudinal displacement based on the determined actual inductances.

20. The position and/or displacement detecting sensor arrangement according to claim 19, wherein each coil defines a flat sensing surface situated on a longitudinal-transverse plane, every flat sensing surface being situated on the same longitudinal-transverse plane.

* * * * *